//; United States Patent [19] [11] 4,273,056
Löfgren et al. [45] Jun. 16, 1981

[54] DIGGING AND PLANTING MACHINE

[75] Inventors: Stig-Gunnar Löfgren, Järved; Bo G. Ekeborg, Bonässund, both of Sweden

[73] Assignee: Mo och Domsjo Aktiebolag, Ornskoldsvik, Sweden

[21] Appl. No.: 40,355

[22] Filed: May 18, 1979

[30] Foreign Application Priority Data

May 22, 1978 [SE] Sweden ............................. 7805797

[51] Int. Cl.³ ............................................. A01C 11/00
[52] U.S. Cl. ............................................. 111/2; 111/89
[58] Field of Search ....................... 111/1, 2, 3, 89, 90, 111/91, 6, 7, 7.2; 172/2, 4, 5, 6; 200/153 LA, 18, 5 A

[56] References Cited

U.S. PATENT DOCUMENTS

| 2,296,500 | 9/1942 | Cain | 111/7.2 |
|---|---|---|---|
| 2,789,167 | 4/1957 | Erbstösser | 200/153 LA |
| 3,176,088 | 3/1965 | Horberg | 200/153 LA |
| 3,586,805 | 6/1971 | Ziegler | 200/153 LA |
| 3,931,774 | 1/1976 | Bradley | 111/3 |
| 3,998,171 | 12/1976 | Lofgren et al. | 111/2 |
| 4,060,043 | 11/1977 | Lofgren | 111/3 |
| 4,067,268 | 1/1978 | Lofgren et al. | 111/2 |
| 4,069,774 | 1/1978 | Lofgren et al. | 111/3 |
| 4,112,857 | 9/1978 | Bradley | 111/3 |

Primary Examiner—James R. Feyrer

[57] ABSTRACT

A digging and planting machine is provided having a tubular digging and planting tool, and at least one sensing and signalling means for sensing the resistance below and/or exceeding a predetermined minimum of the ground to penetration by the digging tip of the tool, thus gauging the condition of the ground, and detecting obstacles to such penetration, so as to ensure that the digging tip provides and a plant is fed to a planting hole of the desired depth, when ground condition is suitable, and, when ground condition is not suitable, that a digging attempt is aborted and a new attempt made as soon as possible.

21 Claims, 6 Drawing Figures

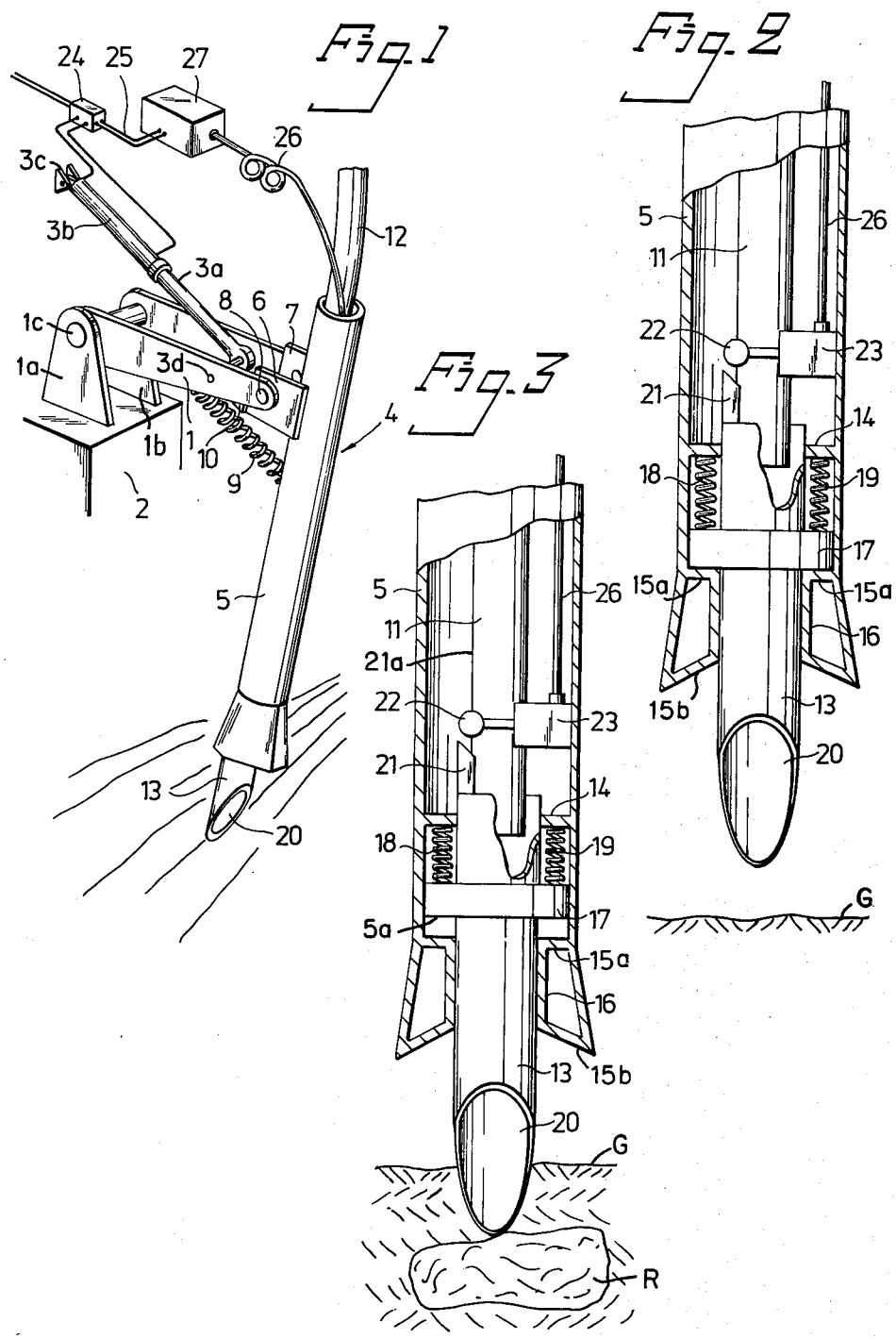

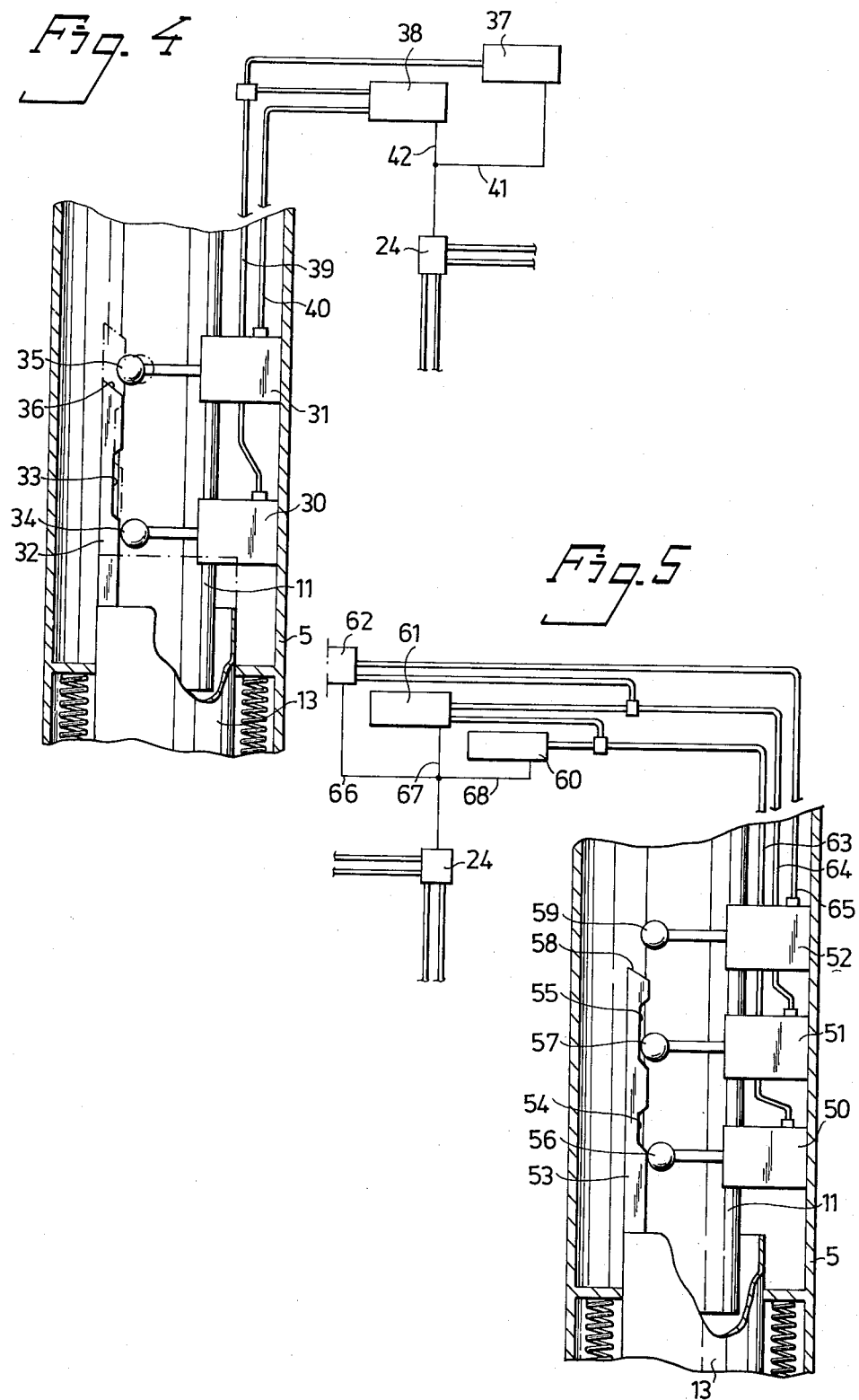

DIGGING AND PLANTING MACHINE

Planting machines are now widely used in reforestation of cut or burned over or otherwise barren forest land. Frequently, however, the machines fail to set the plants in deeply enough, and as a result the plants do not grow well and may die. This problem is due to the presence of obstacles in the ground, such as stones, stubs, large roots and the like, which prevent the digging devices of the planter from penetrating deeply enough into the ground.

Other problems arise if the plant is planted in sandy soil, or in soil that is wet or even muddy. In such cases, the plant may die because the soil conditions are unsuitable for growth.

There are two main types of reforestation or planting machines: those provided with tubular hole-making devices, and those provided with tubular plowing devices, which dig a furrow that has the hole at a deep end or portion thereof. Both of these devices operate intermittently. The tubular plowing device has a number of serious disadvantages. Such devices take longer to plow a hole and plant a plant than the short time, from 2 to 4 seconds, allotted for each single planting operation, due to the fact that the feed-out end of the planting tool is either substantially planar or slightly V-shaped. Consequently, the planting means, despite its simultaneous forward movement, encounters a high degree of resistance when moved into the ground.

To ensure that each plant is set to a proper depth, it is necessary to measure accurately the depth of the hole in which the plant is to be set, and transfer the plants from the machine to a hole only when the hole is deep enough. Devices for measuring or sensing the depth of a hole in which a plant is to be set are normally constructed so that the digging tool itself measures the depth of the hole, with the surface of the ground as a reference surface for a slide shoe or the like connected with said digging tool, and moved along said surface of the ground. However, such a device can give a signal for transferring a plant from the planting apparatus to the intended hole when the hole is too shallow, if the slide shoe becomes positioned at a higher level than the ground, on a raised stone or some other obstacle at the same time as the digging tool digs into the ground. In such a case the vertical distance between the upper surface of the obstacle and the point of the digging tool is the sum of the elevation of the object above the ground and the resulting depth of the hole, and the correct depth is signalled when the hole is too shallow.

The planting device upon being moved into the ground also may rest on a branch or the like extending in the direction of movement by the planting machine, when the planting apparatus is preceded along its forward movement path by a ground-preparing scarifying wheel or the like. Branches picked up by the wheel are moved to beneath the planting device, thereby delaying the insertion of said device into the ground, so that a plant is either fed from the planting machine too early, or not at all.

Another disadvantage of tubular plowing devices is that, even when the devices are arranged to be inserted into the ground with an oblique, downward movement, the earth tends to penetrate the plant exit opening of the planting device, and makes feeding of the plants through the opening difficult. The reason why earth penetrates the planting tube is that the downwardly facing opening of the tubular planting device is either substantially horizontal or is inclined to the surface of the ground at an angle which is smaller than the angle formed between the movement path of the planting device and the surface of the ground.

In accordance with U.S. Pat. No. 3,998,171, patented Dec. 21, 1976, to Lofgren and Moberg, a planting machine is provided having a pneumatic depth indicator on the digging tool and comprising at least one gas conduit for conveying a gas under superatmospheric pressure from one end to the other end thereof, the one end being connected to a gas supply source, and the other end being open to atmosphere and spaced a distance from the digging tool end equal to the depth of the hole dug by the tool for a plant, the other end being so arranged that the opening to atmosphere is plunged into blocking contact to the earth when the predetermined hole depth is reached, thereby halting flow of gas from the conduit.

A further problem with some types of tubular plowing devices having an open digging tip end is, that a plant cannot be placed in the tube until the planting site has been selected by the operator, and the tube is located over it. Since many suitable planting sites are not greater than about 0.5 to 1 $m^2$ in area, at excessive vehicle speeds the planting tube is liable to pass the planting site, or to be located over a place where the depth of earth is not favorable, before the plant can be delivered from the tube. To reduce this risk, it has been necessary to drive the machine at a relatively low forward speed, which greatly reduces the planting capability of the machine.

Another problem is that the open tip end of the tool can strike hard against stones and other obstacles in the ground, resulting eventually in a sufficient deformation of the tip end to render it unserviceable. This has limited the speed at which the planting tool can be inserted into the ground.

In accordance with U.S. Pat. No. 4,060,043, patented Nov. 29, 1977 to Lofgren, a planting machine is provided which reduces the distance through which a plant must travel at the actual moment of planting, and increases the speed at which the digging and planting tube can dig a hole and plant a plant without danger of obstruction. The digging and planting machine according to that invention comprises at least one tubular digging and planting tool, movable between ground-contacting and ground-elevated positions, and having an open digging and planting tip end; closure means movable between a first position closing off the open end for digging a hole and a second position exposing the open end for delivery of a plant from the planting tool into the hole; and means for compacting earth around the plant after planting.

The closure means makes it possible to retain a plant in the tool at the exit opening while a hole is being dug by the tool, so that a plant can be held in a position of readiness, adjacent the exit opening, for delivery to the hole as soon as it is dug. Because of the relatively short path through which the plant has to move when discharged from the tool, the machine can be advanced at a relatively high speed, without risk of the plant landing outside the planting site when the closure is opened, and it is discharged from the tube.

Furthermore, since the exit opening of the tube is closed while the tip is digging a hole, earth, stones, wood and other objects cannot enter the tube, and obstruct delivery of the plant to the hole.

In a variation of these devices, U.S. Pat. No. 4,067,268 patented Jan. 10, 1978 provides a digging and planting machine having a tubular digging and planting tool, and means for compacting earth around the plant after planting, movable between ground-contacting and ground-elevated positions, the compacting means carrying the tubular digging and planting tool, and being movable into an earth-compacting position when the digging and planting tool is in a ground-elevated position.

A further problem arises from variations in the lay of the land. The surface of the ground is normally uneven, with hollows and mounds or upstanding stones and the like, all within the span of the wheels and the wheelbase of the vehicle. This means that if the height of the vehicle above the ground constitutes a reference level for hole-digging operations, the plants may be planted at a depth which is either too shallow or too deep.

Consequently, it has been suggested that either before or at the same time as the planting device is inserted into the ground a separate sensing device establish the lay of the ground at the planting site, in relation to the vehicle and the digging tool. Then, the subsequent digging operations can be determined, and the planting device actuated accordingly. This poses a new difficulty, since the sensing device may encounter a stone, a thick branch, or some other obstacle which projects out of the ground, thereby erroneously indicating the upper surface of the obstacle as the surface of the ground. As a result the subsequent digging operations are premature so that the plant is planted at a depth which is too shallow.

U.S. Pat. No. 4,069,774, patented Jan. 24, 1978, overcomes this difficulty by providing a digging and planting machine having a tubular digging and planting tool, and at least two surface-detecting and signalling means for sensing the surface of the ground adjacent the digging tip of the tool, preferably on opposed sides of the digging tip, thus gauging the lay of the surface, so as to ensure that the digging tip provides and a plant is fed to a planting hole of the desired depth. The surface-detecting and signalling devices are interconnected so that at least two devices must be in contact with the ground or obstacles thereon, so as to ascertain the lay of the ground prior to or during the insertion of the planting device thereinto.

Since the apparatus is provided with surface-detecting means, premature or late digging due to the presence of obstacles projecting from the surface of the ground and hollows therein when using the level of the vehicle as a reference level is prevented. A plurality of such ground surface-detecting devices preferably on opposed sides of the digging and planting tool, which must co-act for digging and planting, detect the surface on each side, and reduce the risks of errors, inasmuch as the probability of each of a plurality of ground sensing devices being located detecting an obstacle on the ground surface while the planting device is able to pass into the ground unimpeded by the obstacle is relatively small, and considerably smaller than in the case where only one ground-detecting device is provided.

Despite these improvements, however, there is still no digging and planting machine that can quickly enough abort a hole-digging operation when frustrated by an obstacle or other cause and dig another hole in a closely adjacent but suitable location, so as to avoid an unduly large spacing of the plants. The problem arises from the continued forward movement of the vehicle on which the machine is mounted while these operations are taking place.

In woodland, obstacles such as stones, tree stumps and roots are so abundant that only about 40% of the ground is suitable for planting. The small areas suitable for planting do not normally exceed 0.5 to 1 $m^2$, and are scattered among concentrations of such obstacles. Hence, if an obstacle is encountered by the digging and planting tool, another hole-making attempt must be made before the vehicle has moved too far, and as quickly as possible, so that the vehicle can travel at a relatively high speed, since the speed of the vehicle largely determines the planting capacity of the apparatus. Accordingly, planting machines which can sense the planting depth are provided with a time relay. The depth sensing device initiates the feeding of a plant from the magazine where the planting tool has reached the intended depth, while the time relay interrupts a hole-making attempt if after a fixed time interval the device has failed to complete the hole, and signals associated control means to attempt a new hole. Thus, the delay time interval of the time relay must be of such a duration as to allow enough time for the planting device during its downward movement to penetrate the earth to the desired planting depth, and also to move through the distance from its starting position above the surface of the ground to its position of first contact therewith. Since virgin forest ground is extremely uneven, with numbers of gulches and hollows, the distance through which the digging and planting tool must move in order to reach the surface of the ground is correspondingly longer, and the delay time must consequently accommodate this.

Since the time delay governs the time that must elapse before a new hole is dug, if the ground is so hard, or so covered with roots, or an obstacle is struck, that the planting tool is unable to penetrate the earth to the desired depth, the tool remains inoperative until this time has expired. This is a waste of time, since the device should be withdrawn from the ground and a new attempt made as soon as its downward movement is stopped.

When planting in virgin woodland, the time relay is normally set at a time delay interval of about 0.8 second, starting from the moment at which the planting device begins its descent. Of this time interval, approximately 0.4 second represents the maximum time the planting tool requires, at a normal descent rate of about 1.5 m/second, to move from its upper at-rest position to the contact with the surface of the ground, while approximately 0.1 second is needed for the planting tool to penetrate the ground to the predetermined planting depth. The remainder of the delay time of approximately 0.3 second is the time required for the planting tool to penetrate to the desired planting depth, even if the ground is somewhat difficult to penetrate, or lies in a deep hollow or rut.

Thus, when the planting tool strikes an obstacle in its downward movement, a time lapse of about 0.4 second is normal between the time the downward movement ceases and the planting tool is moved away from the ground. In addition to this, about 0.2 second is taken to raise the planting tool approximately halfway to the upper at-rest position, to an intermediate position above the surface of the ground, and an equal length of time to return the tool into contact with the ground for a further hole-making attempt. The total time required for the planting tool to reach the ground in a further hole-forming attempt can thus be approximately 0.8 second. During this time, the vehicle moves forward a distance of from 0.4 to 0.5 meter, at a normal driving speed of 2 km/hour. Consequently, the time consumed in initiating a further hole-forming attempt not only means a loss in time but also spaces the plants too far apart with an unnecessary waste of productive ground.

The present invention overcomes the elapsed time problem by providing a digging and planting machine having a tubular digging and planting tool, and at least one sensing and signalling means for sensing a resistance below and/or exceeding a predetermined minimum to penetration of the ground by the digging tip of the tool, or its equivalent, thus gauging the condition of the ground, and detecting obstacles to such penetration so as to ensure that the digging tip provides and a plant is fed to a planting hole of the desired depth, and controlling the raising and lowering of the digging and planting tool towards and away from the ground so that the digging and planting tool makes another hole-digging attempt as soon as an attempt is aborted.

The digging and planting machine in accordance with the invention comprises, in combination, a vehicle, and, carried on the vehicle, a digging and planting tool including a tubular member movable between a lower position partially embedded in the ground and an upper position above the ground, and having an open digging and planting tip end, for digging a hole and conveying a plant to the hole; means for moving the tubular member between its lower and upper positions; at least one sensing and signalling means for sensing an abnormal resistance below and/or above a predetermined minimum to penetration of the ground by the digging tip of the tool, thus gauging the condition of the ground, and detecting obstacles to such penetration; and means operatively connected to the signalling means for controlling the movement of the tubular member between its upper and lower positions in response to a signal from the signalling means, so as to abort a digging attempt and promptly start another digging attempt, while in the absence of abnormal resistance to provide a hole of the desired depth.

While at least one sensing and signalling means is necessary, additional sensing and ground-condition-detecting functions can be carried out if two, three or more such sensing and signalling means are provided. Thus, one sensing means can detect too soft a ground condition, indicating sand or mud, by a resistance below a predetermined minimum; another sensing means can detect too hard a ground condition, such as obstacles, by a resistance above a predetermined minimum; and another sensing means can detect an acceptable ground condition.

The time required for the digging and planting tool to carry out a normal digging operation can be controlled by a time relay, which in the absence of a signal of abnormal resistance to penetration of the ground by the digging and planting tool controls can run its full time cycle and so control raising of the tool to its at-rest position after the hole is dug and the plant planted in it. The signalling means can then interrupt the time relay and prematurely cut this time so that the tool immediately returns to the at-rest position when the digging must be aborted.

The sensing and signalling means can be carried on the vehicle together with or separately from the digging and planting tool. If it be with the tool, it can be operatively connected to a reciprocably movable digging tip which is biased towards the ground, and which is moved against the biasing force when a predetermined resistance to penetration of the ground by the tip is encountered. The tip can be made to actuate the sensing and signalling means after having moved a selected distance. If several sensing and signalling means are used, these can be arranged to be actuated in sequence after the tip has moved a selected increment of its full reciprocation.

If the sensing and signalling means be carried on the vehicle in a separate location spaced from the digging and planting tool, then it is operatively connected to a reciprocable feeler means equivalent to the digging tip which is biased towards the ground, and which is moved against the biasing force when a predetermined resistance to penetration of the ground by the feeler means is encountered. The feeler means can be made to actuate the sensing and signalling means after having moved a selected distance. If several sensing and signalling means are used, these can be arranged to be actuated in sequence after the feeler has moved a selected increment of its full reciprocation.

In addition to the above, the machine also can include means for compacting earth about the plant after it has been deposited in the hole; and means for moving the digging and planting tool and the compacting means separately and together between ground-elevated and ground-contacting positions. Suitable compacting means are described in U.S. Pat. Nos. 4,060,043 and 4,067,268, the disclosures of which are hereby incorporated by reference.

In addition to the above, the open tip end of the digging and planting tool can comprise closure means movable between a first position closing off the open end for digging a hole, and a second position exposing the open end for delivery of a plant from the planting tool into the hole. Suitable closure means is described in U.S. Pat. No. 4,060,043, the disclosure of which is hereby incorporated by reference.

The means for moving the closure means between end-open and end-closed positions, such as a piston and hydraulic cylinder, can be arranged at the same time to reciprocate the digging and planting tool alone, or together with the compacting means, between ground-elevated and ground-contacting positions, and vice versa.

The term "condition of the ground" is used herein generically to refer to whatever the condition is, on the surface or below the surface, and includes not only the condition of the earth itself, but also its condition including stones or rocks and like obstacles to digging, on or in the ground.

Preferred embodiments of the digging and planting machine of the invention are shown in the drawings, in which:

FIG. 1 is a perspective view of a digging and planting machine including one sensing and signalling means in accordance with the invention for ascertaining the condition of the ground, aborting a digging attempt and promptly starting another digging attempt;

FIG. 2 is a cross-sectional view through the digging tip and a portion of the cylindrical tube 5 of the digging and planting machine of FIG. 1, in the at-rest position before the start of the digging and planting operation;

FIG. 3 is a cross-sectional view of the same portion of the machine of FIG. 1 as FIG. 2 in the digging stage with the digging tip in the soil at a planting depth nearly equal to the length of the tip;

FIG. 4 is a cross sectional view through an end portion of the cylindrical tube 5 of another embodiment of the digging and planting machine in accordance with the invention, having two sensing and signalling means for sensing ground conditions at two stages of the digging, in sequence; and aborting and promptly beginning another digging attempt when required by any of the sensing means;

Figure 6:
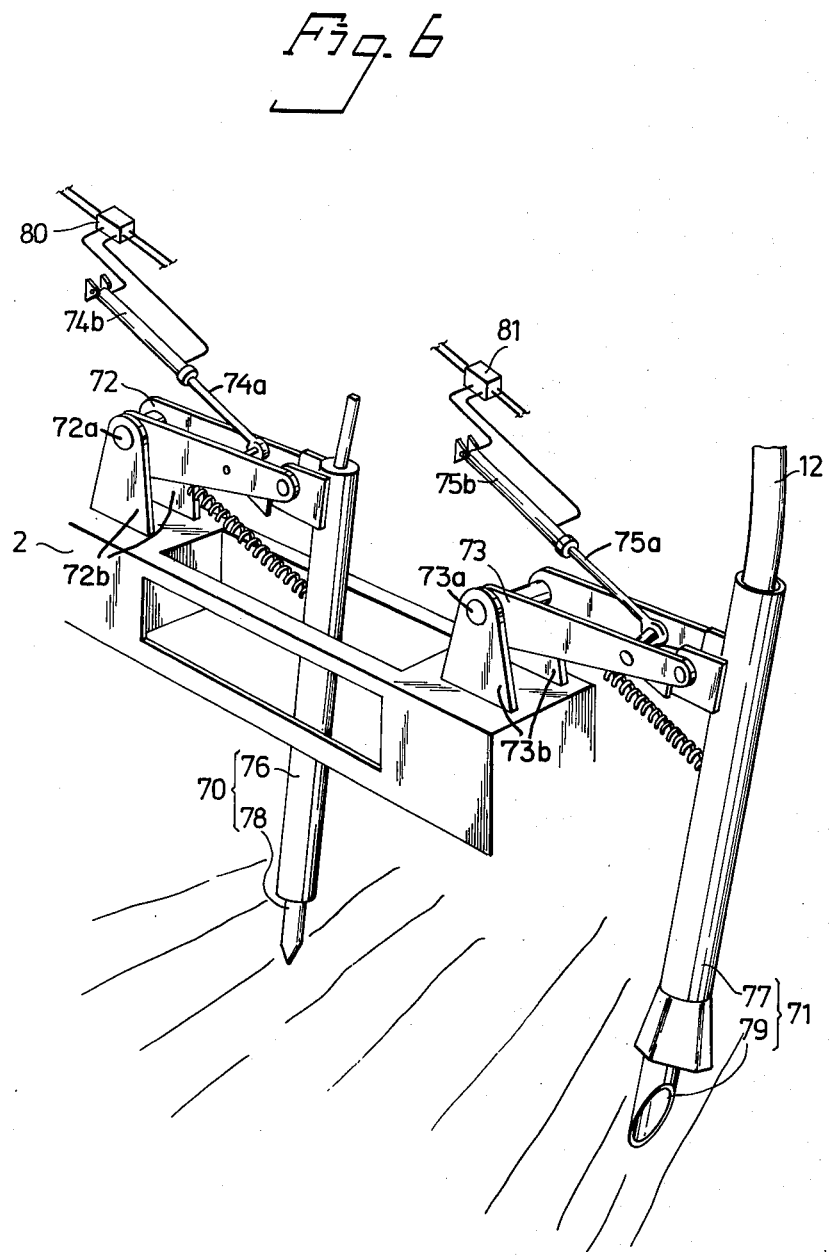

FIG. 5 is a cross-sectional view through an end portion of the cylindrical tube 5 of another embodiment of digging and planting maching in accordance with the invention having three sensing and signalling means for sensing ground conditions at three stages of the digging, in sequence; and aborting and promptly beginning another digging attempt when required by any of the sensing means; and FIG. 6 is a perspective view of another embodiment of planting machine in accordance with the invention having the sensing and signalling means separate and spaced from the digging and planting machine on the vehicle carrying both.

The digging and planting machine shown in FIGS. 1 to 3 and indicated generally by reference numeral 4 is mounted on a vehicle 2 via a lifting arm 1. The lifting arm 1 is supported on mountings 1a, 1b on pivot pin 1c for pivotal movement towards and away from the ground. Such movement is effected by the hydraulic piston 3a and cylinder 3b. The hydraulic cylinder 3b is mounted on the vehicle 2 on the pivot mounting 3c, and operatively connected to the lifting arm 1 via the pivot axle 3d. Accordingly, movement of the piston 3a in and out of the cylinder 3b raises and lowers the lever arm 1.

The digging and planting machine 4 in turn is pivotably mounted via the fixed brackets 6, 7 and pivot pin 8 to the outer end of the lifting arm 1. In consequence, the digging and planting tool, composed of the cylinder 5, digging tip 13, planting tube 11 and plant feed tube 12, is raised and lowered away from and towards the ground by the lever arm 1. It will be noted that the digging tip 13 is open at the lower end 20, and cut at an angle across the tip so that the pointed tip faces forward and the opening 20 rearward as the vehicle 2 moves forward along the ground surface.

In a preferred device, the open tip 13 can be closed off by a closure. The closure can, for example, be provided as described and shown in FIG. 2 of U.S. Pat. No. 4,060,043. In addition, a tamping or compacting means can be provided, as shown in this Figure, the disclosure of which patent is accordingly incorporated by reference.

The tension spring 9, mounted at one end to the tube 5 of the digging and planting tool, and at the other end to the lever arm 1, biases the digging and planting tool into the obliquely forward and downward position shown in FIG. 1, in which the bracket structure 6, 7 abuts the two stops 10 at the end of the lifting arm 1, which serve to retain the tube 5 in the position shown under the biasing force of the spring 9.

The tube 5 has an open concentric plant conveyor tube 11 extending at the upper end into connection with a plant supply tube 12 leading from a plant supply on to the vehicle 2 (and not shown in the drawing), from which the plants can be fed one at a time into the tube 11, to the tip 13. The lower end of the tube 11 is in direct connection with the interior of the tubular digging and planting tip 13, which is reciprocably mounted for telescopic movement over the lower end of the tube 11, in an upward and downward movement within the tube 5 along the cylindrical guide or track 16 and the annular shoulder 14 of the tube 5. The tubular guide 16 is supported on the tube 5 within the upper and lower annular shoulders 15a and 15b, respectively.

Extending about the outer periphery of the upper end of the digging and planting tip 13 and fixedly attached thereto is an annular flange 17, whose outer periphery closely abuts the inside wall of the tube 5 in the lower portion 5a above shoulder 15a. Between the lower face of the shoulder 14 and the upper face of the flange 17 are retained two compression springs 18, 19, which bias the planting tip 13 towards its lowermost position (as seen in FIG. 2, with the tool at rest), in which position the flange 17 abuts the shoulder 15. Thus, the amount of travel of the tip 13 between shoulders 14, 15a under the stress of the force resisting penetration of the tip into the ground during a digging attempt is restricted by the compressibility of the springs 18, 19, which determines the uppermost position of the tip under such stress, and the shoulder 15a, which determines the lowermost position of the tip. The compressive force of the springs establishes a minimum threshold of resisting force which must be exceeded before the tip will begin to move inwards against the springs. In both its upper and lower limiting positions, the tip 13 projects from the lower portion 5a of the tube 5.

At the upper and inner end of the digging and planting tip 13 is fixed an actuator rod 21 having a chamfered tip 21a. The rod 21 is in a nonactuating position (seen in FIG. 2) when the digging and planting tip 13 is in its lowermost position, with the flange 17 against the shoulder 15. When the digging and planting tip 13 has come into contact with some obstacle offering resistance to its penetration into the ground however (such as the rock R in FIG. 3), the tip 13 is forced upwardly, and the flange 17 moves upwardly against the compressive resistance of the springs 18, 19. As this upward movement takes place, the actuator rod 21 also moves upwardly and eventually when the resistance exceeds the predetermined minimum the rod 21 moves far enough to contact the sensing button 22 of an electric signalling device 23. The device 23 can, for example, be an electric switch, which is closed when the actuator button 22 is depressed by rod 21. A suitable such device is described and shown in U.S. Pat. No. 4,069,774, FIG. 2, the disclosure of which is incorporated by reference. When the button 22 is depressed by the end of rod 21, the device 23 gives a signal which is transmitted via the electric wire 26 to the time relay 27 (see FIG. 1), which in turn is operatively connected via the wire 25 and the operating control 24 to the hydraulic piston 3a and cylinder 3b. The time relay 27 is a timer, and can be an electric timer, an electronic timer, or a digital timer. The control 24 is in this case a solenoid valve which is opened and closed by the time relay 27 to control the flow of fluid towards and away from the hydraulic cylinder 3, so that the actuation of the cylinder 3b and piston 3a is controlled by the relay 27. The relay is turned on by the operator when the control 24 is to effect a digging attempt by the tool, and times the digging and planting cycle so as to withdraw the tool from the ground when planting is complete. An unsuccessful digging attempt is aborted by the sensing and signalling device 23.

Operation of the machine of FIGS. 1 to 3 is as follows:

The vehicle carrying the digging and planting machine is driven across the planting area. When the operator sees what appears to be a suitable planting location, he operates the control 24 to actuate the hydraulic cylinder 3b and piston 3a, to lower the digging and planting tool, bringing tip 13 into contact with the ground, from the position shown in FIG. 2 into the position shown in FIG. 3. The time relay 27 is automatically energized to clock the digging and planting time interval at the same time as the tool 13 begins its downward movement.

The digging and planting tip 13 accordingly reaches the ground G, and begins to penetrate it. When the tip encounters some obstacle preventing penetration of the ground (for example, as seen in FIG. 3, a rock R), the resistance to penetration exceeds the compressive force of the springs 18, 19, with the result that the tip 13 is forced inwardly and upwardly, telescoping over the central tube 11, and eventually bringing the actuator rod 21 into contact with and actuating the sensing button 22 of the signalling device 23. Accordingly, the distance through which the tip moves is a function of the capability of movement of the tip, which in turn reflects the relative ease or difficulty with which the tip can enter the ground.

The compressive strengths of the springs 18, 19 are therefore so selected that the resistance to the telescopic movement of the digging and planting tip 13 is overcome only when the ground is so hard, or the obstacle so difficult to penetrate or dislodge, that planting cannot take place.

If the planting conditions are favorable, so that the digging and planting tip 13 penetrates the ground to the intended planting depth without moving inwardly and actuating the switch 23, the tip 13 is held in the planting hole long enough to permit the feeding of a plant into the hole. When the tool is in the hole the tube 5 is swung rearwardly against the force of the spring 9. The time interval clocked by the time relay 27 corresponds to the time required for the digging and planting tool to reach the proper depth under normal conditions, and when this time has passed, the time relay transmits a signal to the plant feeding means, which accordingly feeds a plant from the supply to the tube 12, and then through the tube 11 and the tip 13 into the hole. The digging and planting tip 13 and in fact the entire tube 5 are then withdrawn from the ground by the hydraulic piston 3a and cylinder 3b, and the lifting arm 1 is returned to its original position, as shown in FIG. 2. This sequence of working movements is repeated automatically, the cycle being determined by the speed of the vehicle and the desired spacing of the plants, assuming the ground conditions are suitable for planting.

If however the ground is too hard, or an obstacle is in the way which makes it impossible to plant, the sensing and signalling device 23 automatically withdraws the digging and planting tool before any valuable time is wasted, and initiates another digging cycle. The tip 13 moves in and up under such conditions, so that the actuator rod 21 actuates the device 23, and a signal is passed to the time relay 27. When this signal is received, the time relay is reset, and the operating means 24 actuates the hydraulic piston 3a and cylinder 3b to withdraw the digging and planting tool and return it to the at-rest position shown in FIG. 2, ready for a new hole-forming attempt, in another location, as selected by the operator.

Table I compares the response times required for digging and planting when using a conventional device in accordance with the prior art, not equipped with sensing means in accordance with the invention, and the device of FIGS. 1 to 3, including such sensing means. In all other respects the device of the prior art is similar to that shown in FIGS. 1 to 3.

The response time is compared in the presence of two different kinds of obstacles, one with the upper surface of the obstacle located above and one beneath the surface of the ground, the latter at a depth corresponding approximately to half the desired planting depth.

Both machines required 0.4 second for the digging and planting tool to reach contact with the surface of the ground from the upper at-rest position shown in FIG. 2, and 0.1 second to reach the desired planting depth after contact with the surface of the ground. In both machines, the time relay 27 was set for a delay time interval of 0.8 second.

TABLE I

| | Elapsed Time in Seconds | | | |
| --- | --- | --- | --- | --- |
| | Digging and planting machine of FIGS. 1 to 3 | | Digging and planting machine of the prior art with a time relay but no sensing and signalling device | |
| | Obstacle above ground surface | Obstacle beneath ground surface | Obstacle above ground surface | Obstacle beneath ground surface |
| Start of tool's downward movement. Time relay energized | 0 | 0 | 0 | 0 |
| Tool strikes an obstacle and downward movement of device ceases. | 0.35 | 0.45 | 0.35 | 0.45 |
| Signalling means activated and transmits signal. | 0.39 | 0.49 | — | — |
| Time relay stops. Start of tool's upward movement. | 0.39 | 0.49 | 0.80 | 0.80 |
| Tool reaches intermediate position above ground surface and commences downward movement in a new hole-forming attempt. Time relay energized. | 0.59 | 0.69 | 1.00 | 1.00 |
| Tool reaches contact with ground surface. | 0.84 | 0.84 | 1.25 | 1.15 |

It is apparent from Table I that the machine of the invention reacts much more quickly than the machine of the prior art when an obstacle is encountered, with much less time lost after the obstacle is encountered and the next hole dug. As seen in Table I, when the obstacle is above the surface of the ground, the machine of the invention saves 0.41 second. When the obstacle is below the surface of the ground, the machine of the invention saves 0.31 second. This means that at a vehicle speed of 2 km/hour, after an obstacle is encountered a new hole-forming operation can be carried out after the vehicle has moved only 0.27 meter when the obstacle is above the ground, and 0.22 meter when the obstacle is below the ground. The machine of the prior art under the exact same conditions moves 0.5 meter and 0.39 meter, respectively. Consequently, the machine of the invention gives a substantial increase in efficiency, and closer spacing of the plants, with more productive forest ground.

In the machine shown in FIG. 4, two sensing and signalling devices 30, 31 and associated operative components are provided. These devices are so arranged in the tube 5 as to be actuated in sequence as the actuator rod 32 attached to the upper end of the digging and planting tip 13 moves upwardly after the device has struck an obstacle or other undue resistance to penetration of the ground. In other respects, the machine of FIG. 4 is identical to that of FIGS. 1 to 3, and therefore like reference numerals are used for like parts, with only the details of the signalling devices and associated circuitry being shown.

When the embodiment shown in FIG. 4 is in the at-rest position corresponding to that shown in FIG. 2, the actuator rod 32 is at a position below that shown in FIG. 4, with the actuator button 34 of the first sensing and signalling device 30 within the recess 33 of the rod 32 (and therefore nonactuated) and the chamfered tip 36 of the rod 32 well below the button 35 of the second sensing and signalling device 31 (which is also nonactuated). The devices 30, 31 can be electric switches, as in the embodiment of FIGS. 1 to 3.

When the digging and planting tip 13 encounters an initial resistance to penetration of the ground, exceeding the biasing force of the springs 18, 19, the tip 13 moves telescopically over the tube 11, and the rod 32 moves upwardly, so that the actuator button 34 moves out of the recess 33 and is depressed against the side of the rod 32, in the position shown in FIG. 4. In this position, the first signalling device 30 is actuated, but the second signalling device 31 is not actuated, because the actuator button 35 is still well above the chamfered tip 36.

If resistance to penetration of tip 13 into the ground increases further, however, the digging and planting tip moves inward further, telescoping over the tube 11, so that the rod 32 continues its upward movement into the dashed line position shown in FIG. 4, in which both the button 34 and the button 35 are actuated, and therefore both sensing and signalling devices 30 and 31 are actuated.

The distances inward that the tip 13 must move to actuate the button actuators 34,35 are determined according to the sensing requirements. In this case, the distances are 20 and 30 mm, respectively, from the extended at-rest position of the digging and planting tip 13 (seen in FIG. 2).

This machine has two time relays 37, 38 of which 38 is connected to the actuator switches 30 and 31, and 37 connected only to switch 30. The time relays 37, 38 are also each connected to the solenoid valve 24 operating the hydraulic piston and cylinder 3 by way of the connecting lines 41, 42. The first signalling device 30 when it is energized deenergizes the time relay 37 and energizes the auxiliary time relay 38, while the signalling device 31 when energized deenergizes the auxiliary time relay 38.

In operation, the main time relay 37 is energized at the same time as the digging and planting tool commences its downward movement from the at-rest position shown in FIG. 2. If the ground is suitable for planting, the digging and planting tip 13 should penetrate the ground with a sufficient resistance to penetration to move it upwardly in the frame a sufficient distance to actuate the first actuator button 34 of signalling device 30. If the signal is not given, this means that the penetration is too easy, which means that the ground at this particular site is too loose for planting, i.e., it is too readily penetrated by the digging and planting tip 13. Such a planting site may, for example, contain too much water, i.e., mud, or it can be sandy. If the device 30 is not actuated, the delay time interval of the main time relay 37 proceeds to its conclusion, this interval being, for instance, 0.8 second, and then the main time relay transmits a signal to the operating means 24 of the hydraulic piston 3a and cylinder 3b, with the result that the digging attempt is aborted as in an unsuitable location, and the digging and planting tool is returned to the uppermost at-rest position, as in FIG. 2. Then, when the main time relay 37 is again energized, the digging and planting tool is again moved towards the ground, in a further digging attempt.

If the planting tip 13 while penetrating the ground is moved upwardly the sufficient distance that results in contact with and actuation of the actuator button 34 of the signalling device 30, thus meaning the ground is suitable for planting, the auxiliary time relay 38 is immediately actuated, while the main time relay 37 is deenergized. Then, if there is no further movement of the actuator rod 32, the machine permits the prescribed time interval to pass, in this case 0.1 second, and the auxiliary time relay 38 then is deenergized. When this happens, a signal is transmitted to the plant feed means, which feeds a plant through the connecting tubes 12, 11 into the tip 13, and thence into the hole. The planting device is then withdrawn from the ground to the uppermost at-rest position shown in FIG. 2, after which the cycle is repeated.

If, however, in its further movement into the ground the digging and planting tip 13 encounters an untoward resistance, such as presented by an obstacle or too hard a ground, so that the predetermined compressive resistance of the springs 18, 19 is further exceeded, permitting further inward movement of the tip 13, then the tool moves inward telescopically over the central tube 11, and the actuator rod 32 moves upwardly another increment, into contact with the second actuator button 35, thus actuating the second signalling device 31. Since this means that the ground is too hard, or that the presence of an obstacle makes it impossible to carry out the planting, the signal from the device 31 interrupts the delay time interval of the auxiliary time relay 38, as a result of which the digging and planting tip 13 is immediately withdrawn from the ground, and a further attempt at digging a hole is made in another location.

Table II gives an illustration of the time response for the device of FIG. 4, according to the ground conditions sensed by each of the signalling devices 30, 31. The stages are listed in sequence of progressive inward movement of the tip 13. The time delay intervals of the main time relay 37 and the auxiliary time relay 38 are 0.8 second and 0.1 second, respectively, and the time for the digging and planting tip 13 to move the rod 32 between the two button actuators 34, 35 requires 0.01 second. Furthermore, the first signalling device 30 is actuated and energized when approximately half the time delay interval of the main time relay 37 has elapsed.

TABLE II

| Stage: | Elapsed Time in Seconds | |
|---|---|---|
| | Ground suitable for planting | Ground unsuitable for planting |
| Tool begins its downward movement from the at-rest position of FIG. 1. Main time relay energized. | 0 | 0 |
| 1. First signalling device 30 is not actuated during the time delay interval of the main time relay. Time delay interval of the main time relay elapses and tool begins its upward movement. (The ground is too loose for planting). | — | 0.80 |
| The first signalling device is actuated when approximately half of the delay time interval of the main time relay has lapsed. The main time relay is deenergized. The auxiliary time relay is energized. | 0.41 | 0.41 |
| 2. The second signalling device is actuated during the time delay interval of the auxiliary time relay. The auxiliary time relay is deenergized. Tool begins its upward movement. (Ground is too hard or the obstacles in the ground are too impenetrable for planting). | — | 0.42 |
| 3. The second signalling device is not actuated during the delay time interval of the auxiliary time relay. The delay time interval of the auxiliary time relay elapses. Feeding of plants begins. | 0.51 | — |

It is apparent from the data in Table II that immediately that the ground is sensed as too hard for planting, the machine of the invention begins a new digging attempt in a significantly lesser time than the prior devices having only one time relay and no signalling devices, where the delay time interval is normally 0.8 second, and a renewed attempt at digging and planting is not begun until this time has elapsed.

If it is desired to indicatewhether the ground is too loose for planting, too hard for planting, or suitable for planting, the machine can be provided with three sensing and signalling devices 50, 51, 52, instead of two, and associated operating components, and such an embodiment is shown in FIG. 5. The device of FIG. 5 is otherwise identical to that of FIG. 4, and so like reference numerals are used for like parts, and only the portion that is different being shown in FIG. 5. As seen in FIG. 5, the actuator rod 53 is now provided with two recesses 54 and 55, so spaced that when the device is in the at-rest position none of the button actuators 56, 57, 59 of the sensing and signalling devices 50, 51, 52, respectively, is actuated. As the rod 53 is moved upwardly with telescopic inward movement of the digging and planting tip 13, the button actuators are actuated in sequence, one at a time, the actuators 56, 57 being actuated by the side of the actuator rod 53, and the actuator 59 being actuated by the chamfered tip 58 of the actuator rod 53.

Correspondingly, the first signalling device 50 is connected via the wire 63 to the time relays 60 and 61, the second signalling device 51 is connected via the wire 64 with the time relays 61 and 62, and the third signalling device 52 is connected via the wire 65 with the third time relay 62. All the time relays are connected with the operating device 24.

In this device, the button actuators 56, 57, 59 are spaced so as to be actuated after 10 mm incremental inward movements of the digging and planting tip 13 over the tube 11. Thus, the displacement distances for the second and third signalling devices are equal to the displacement distances of the first and second signalling devices of the machine of FIG. 4.

The connections between the signalling devices and the time relays are so made that the first signalling device 50, when actuated, deenergizes the main time relay 60, and energizes the first auxiliary time relay 61. The second signalling device 51, when actuated, deenergizes the auxiliary time relay 61, and energizes the second auxiliary time relay 62. The third signalling device 52, when actuated, deenergizes the auxiliary time relay 62.

In the operation of this embodiment, the main time relay 60 is energized when the digging and planting tool commences to move downwardly from its upper at-rest position shown in FIG. 2. If in the course of this movement the digging and planting tip 13 does not encounter any resistance, usual or unusual, sufficient to cause it to move inwardly so as to actuate the first signalling device 50 via the actuator button 56, this indicates either that the digging and planting tip has not actually reached the ground, or is hung up before the tip can reach the ground, or the tip has reached the ground and has penetrated such extremely loose earth or mud that the resistance is below a predetermined minimum needed to move the tip 13 inwardly sufficiently. Accordingly, when the time interval of 0.8 second has elapsed, a signal is sent to the operating means 24 which results in aborting the digging attempt, withdrawal of the digging and planting tool, and an immediate attempt to carry out a further digging and planting cycle.

If however the digging and planting tip 13 encounters sufficient resistance to penetration of the ground to exceed the predetermined minimum, and move it inwardly a sufficient distance to actuate the actuator button 56, the time delay interval of the main time relay 50 is interrupted, and the auxiliary time relay 61 is energized. The time delay interval for this relay is 0.1 second.

If the ground is suitable for planting, the inward movement of the digging and planting tip 13 will continue a sufficient distance to actuate the second actuator button 57 of the second signalling device 51. If the second signalling device 51 is actuated during the time delay interval of the first auxiliary time relay 61, the first auxiliary time relay 61 is deenergized and the second auxiliary time relay 62 is energized. The time interval of this relay is also 0.1 second. If during this time delay interval the third signalling device 52 is not actuated, this means that the resistance to penetration is normal, and not excessive, so that the digging and planting tool has reached the required depth for planting, and consequently the apparatus awaits the elapsing of this time interval, at which time the time relay sends a pulse to the plant feeding means, which results in a plant being fed from the supply to the tubes 12, 11 and then through the digging and planting tip 13 into the hole. The planting device is then returned to its upper at-rest position, for another digging and planting cycle.

If however the second signalling device 51 is not actuated by the digging and planting tip during the time delay interval of the auxiliary time relay 61, this means that, while the planting device has penetrated the ground, the ground is too loose for planting or is otherwise unsuitable, and it is necessary to try again someplace else. The machine therefore waits until the time delay interval has elapsed, and then, when the auxiliary time relay 61 is deenergized, it sends a signal to the operating means 24 of the piston 3a and cylinder 3b, whereupon the digging and planting tool is withdrawn from the ground, and then immediately lowered to carry out a further digging attempt. Due to the short time delay interval of the auxiliary time relay 61, it is possible to make a further hole-forming effort very quickly, without appreciable time being lost.

If after actuation of the second signalling device 51, and during the time delay interval of the auxiliary time relay 62, the digging and planting tip 13 continues to move into the frame, indicating that it has encountered some obstacle, the third button actuator 59 is actuated, with the result that the third signalling device 52 gives a signal. Thereupon the auxiliary time relay 62 is deenergized and the digging is aborted, and the digging and planting tool is immediately withdrawn from the ground, to be moved again downwardly in another location for a further planting attempt.

Table III shows the time response for a digging and planting machine of FIG. 5 in each of the stages described above, in the sequence of actuation of the signalling devices.

The time delay intervals of the main time relay 60 and the auxiliary time relay 61, 62 are 0.8 and 0.1 second, respectively. The signalling devices are actuated at time intervals of 0.01 second, with a continued movement of the digging and planting tip 13 into the tube 5. The first signalling device 50 is actuated when approximately half of the delay time interval of the main time relay 60 has elapsed.

TABLE III

|  | Elapsed Time in Seconds | |
|---|---|---|
|  | Ground suitable for planting | Ground unsuitable for planting |
| Tool begins its downward movement from the upper at-rest position. The main time relay is energized. | 0 | 0 |
| 1. The first signalling device is not actuated during the time delay interval of the main time relay. The delay interval of the main time relay elapses, and the tool begins its upward movement. (The tip of the planting device does not come into contact with the ground or an obstacle therein). | — | 0.80 |
| The first signalling device is actuated when approximately half of the time limit interval of the main time relay has expired. The main time relay is deenergized. The first auxiliary time relay is energized. | 0.40 | 0.40 |
| 2. The second signalling device is not actuated during the time limit interval of the first auxiliary time relay. The time limit interval of the first auxiliary time relay elapses. The tool begins to move upwards. (The ground too loose for planting). | — | 0.50 |
| The second signalling device is actuated during the time limit interval of the first auxiliary time relay. The first auxiliary time relay is deenergized. The second auxiliary time relay is energized. | 0.41 | 0.41 |
| 3. The third signalling device is actuated during the time limit interval of the second auxiliary time relay. The second auxiliary time relay is deenergized. The tool begins to move upwards. (The ground too hard for planting or unimpenetrable object). | — | 0.42 |
| 4. The third signalling device is not actuated during the time limit interval of the second auxiliary time relay. The time limit interval of the auxiliary time relay elapses, and plant is fed to the hole. | 0.51 | — |

It is apparent from the data in Table III that a significant time saving is obtained in use of the machine of FIG. 5.

When the ground is too loose for planting, the next attempt for planting is begun in less time in the embodiment of FIG. 5 than in the other embodiments of the invention described previously. The device of FIG. 4 gives a response time for ground that is too loose for planting of 0.8 second, while in the case of the embodiment of FIG. 5, the next attempt for planting is made after only 0.5 second.

Many variations can be made in the structure of the apparatus of the invention as illustrated in the drawings.

In the device shown in FIGS. 1 to 5, the digging and planting machine is carried on a vehicle, with the sensing and signalling means and the digging and planting tool in combination together at the same location on the vehicle. It is also possible to mount the sensing and signalling means at a different location on the vehicle, for separate up and down movement in a location spaced from and ahead of the digging and planting tool, to enable it to detect the condition of the ground in advance of the digging and planting operation. Such an embodiment is illustrated in FIG. 6.

In this embodiment, the sensing and signalling means 70 and the digging and planting machine 71 are each carried separately, one behind the other, on their respective lifting arms 72, 73, each arm being pivotably mounted on the vehicle via pivot pins 72a, 73a on the bracket supports 72b, 73b. Thus, the sensing and signalling means 70 and the digging and planting tool 71 can be raised and lowered independently of each other by separate hydraulic pistons 74a, 75a and cylinders 74b, 75b and associated operating controls 80, 81. The tip 78 of the sensing and signalling means 70 is equivalent to the tip 79 of the digging and planting tool, so that the ground condition that is sensed is correlatable with the digging and planting capability of the tool.

Each of the ground sensing means 70 and the digging and planting tool 71 comprise an outer tube 76, 77 with an inwardly telescopically reciprocable tip 78, 79 at the lower portion of each. The ground sensing tip 78 and the digging and planting tip 79 are each spring-biased downwardly in the tube 76, 77. The tip 78 is solid, while the tip 79 is tubular, so that plants can be moved therethrough into the hole dug by the tip. The spring biasing is effected in the same manner as shown in the device shown in FIGS. 1 to 3.

The digging and planting tool 71 is connected to a plant supply by way of the line 12, from which supply the plants can be fed out to the feed tube 11, and then passed through the tip 79 into the hole.

The ground sensing tool 70 carries one, two or three signalling devices, arranged in the same way with respect to an actuator rod attached to the tip 78 as the devices of FIGS. 1 to 3, 4 and 5, respectively, together with the corresponding number of time relays and controls controlling the upward and downward movement of the sensing tool 70 and the digging and planting tool 71, and the plant feeding means. Accordingly, these are not shown in FIG. 6.

In order to make it possible to move the digging and planting tool into an area of the ground examined by the ground sensing tool immediately prior thereto, regardless of variations in the rate of travel of the vehicle, the apparatus can be combined with a counter of conventional type for continuously detecting and counting the number of rotations of a wheel or axle and thus indicating the distance through which the vehicle has been moved in any given time. The counter can then actuate the tool whenever a predetermined total count (and distance) has been reached. The counter can be coupled to one of the wheel shafts of the vehicle, or to the transmission shaft. The counter makes it possible to initiate the downward movement of the digging and planting tool at a point in time which is not only determined by the signalling devices and the time relays, but also with respect to the distance between the ground sensing tool and the digging and planting tool, and the distance through which the vehicle has travelled after the signal has been transmitted.

Although in the device as shown in the drawings the biasing of the digging and planting tool is by way of compression springs, other biasing means can be used, including, for instance, pneumatic or hydraulic piston and cylinder devices, the latter optionally being connected to a fluid accumulator of conventional type which collects beneath a fixed gas volume, the fluid expelled from the piston cylinder chamber when the piston is forced inwardly by pressure on the piston. The resulting contraction of the gas volume, and increase in gas pressure automatically forces the piston out again when inward pressure on the piston is reduced.

The signalling devices can be mechanically- or detent-operated switches of the open and closed circuit type, as shown in the Figures. They can also be of the so-called contact-free switches, i.e., magnetic or inductive switches, so that the button actuators or other types of actuators or mechanical actuating devices can be omitted.

Having regard to the foregoing disclosure, the following is claimed as inventive and patentable embodiments thereof:

1. A digging and planting machine having a tubular digging and planting tool; at least one sensing and signalling means for sensing a resistance below and/or exceeding a predetermined value to penetration of the ground by the digging tip of the tool, thus gauging the condition of the ground, and detecting obstacles to such penetration so as to ensure that the digging tip provides and a plant is fed to a planting hole of the desired depth, and a digging attempt is aborted if this be impossible, and comprising an elongated member movable towards and away from the ground in a selected location where a planting hole is to be dug; means biasing the elongated member resiliently towards the ground with a force opposed by the force resisting penetration of the member into the ground, the biasing force being insufficient to prevent movement of the member against the biasing force at a resisting force above a predetermined minimum; at least one signalling means and at least one signal actuating means operatively associated with the elongated member and responding to a predetermined movement of the elongated member as a function of the penetrability of the ground, due to the condition of the ground at that location, by actuating the signalling means to give a signal indicating that the elongated member has detected a resisting force above the predetermined minimum showing the digging tip cannot provide a planting hole of the desired depth; and timing control means operatively connected to the sensing and signalling means and establishing and controlling the time for the digging and planting tool to carry out a normal cyclic digging and planting operation; and the raising and lowering of the digging and planting tool towards and away from the ground, and, in response to the signal, aborting that digging attempt and causing the digging and planting tool to make another hole-digging attempt as soon as the attempt is aborted.

2. A digging and planting machine according to claim 1 in which the actuating means is a detent which actuates the signalling means.

3. A digging and planting machine according to claim 1 in which the signalling means is an electric switch and gives an electric signal.

4. A digging and planting machine according to claim 1 in which the elongated member is arranged for movement in a substantially vertical direction and has a lower end which is adapted to engage the ground, which is reciprocably movable with respect to the elongated member, and which is biased towards the ground.

5. A digging and planting machine according to claim 4 in which the elongated member comprises a plurality of signal actuating means and of signalling means, each signal actuating means actuating only one signalling means, each signalling means being actuated and signalling a ground condition corresponding to the resisting force required to move the lower end to that actuating position.

6. A digging and planting machine according to claim 1 in which the elongated member comprises a planting tube and its lower end a digging tip, and a plant feeding means connected to a plant supply and to the planting tube for feeding a plant to a hole formed by the digging tip in the ground.

7. A digging and planting machine according to claim 1 in which the elongated member is a feeler member and is in operative connection with a digging and planting tool.

8. A digging and planting machine according to claim 1 having at least one time relay operatively connected with the timing control and the sensing and signalling means, the time relay being arranged to be energized and deenergized by signals from the signalling means; and the timing control means being responsive to at least one of (a) expiration of the time delay interval and (b) an interruption of the time delay interval to initiate at least one of (A) a further attempt to dig a hole and (B) the feeding of a plant to the planting hole, according to the signal received.

9. A digging and planting machine according to claim 1 in which the biasing force is provided by a spring.

10. A digging and planting machine comprising, in combination, a vehicle, and, carried on the vehicle, a digging and planting tool including a tubular member movable between a lower position partially embedded in the ground and an upper position above the ground, and having an open digging and planting tip end, for digging a hole and conveying a plant to the hole; means for moving the tubular member between its lower and upper positions; at least one sensing and signalling means for sensing an abnormal resistance below and/or above a predetermined minimum to penetration of the ground by the digging tip of the tool, thus gauging the condition of the ground, and detecting obstacles to such penetration; so as to ensure that the digging tip provides and a plant is fed to a planting hole of the desired depth, and a digging attempt is aborted if this be impossible; and comprising an elongated member movable towards and away from the ground in a selected location where a planting hole is to be dug; means biasing the elongated member resiliently towards the ground with a force opposed by the force resisting penetration of the member into the ground, the biasing force being insufficient to prevent movement of the member against the biasing force at a resisting force above a predetermined minimum; at least one signalling means and at least one signal actuating means operatively associated with the elongated member and responding to a predetermined movement of the elongated member as a function of the penetrability of the ground due to the condition of the ground at that location, by actuating the signalling means to give a signal indicating that the elongated member has detected a resisting force above the predetermined minimum showing the digging tip cannot provide a planting hole of the desired depth; and timing control means operatively connected to the sensing and signalling means and establishing and controlling the time for the digging and planting tool to carry out a normal cyclic digging and planting operation; and the movement of the tubular member between its upper and lower positions, and, in response to a signal from the signalling means aborting a digging attempt and promptly starting another digging attempt, while in the absence of abnormal resistance providing a hole of the desired depth.

11. A digging and planting machine according to claim 10 having two sensing and signalling means, each detecting different ground conditions.

12. A digging and planting machine according to claim 11 in which one sensing means detects too soft a ground condition, by a resistance below a predetermined minimum; and the second sensing means detects too hard a ground condition by a resistance above a predetermined minimum.

13. A digging and planting machine according to claim 10 having three sensing and signalling means, each detecting different ground conditions.

14. A digging and planting machine according to claim 13 in which one sensing means detects too soft a ground condition, by a resistance below a predetermined minimum; the second sensing means detects too hard a ground condition by a resistance above a predetermined minimum; and the third sensing means detects an acceptable ground condition.

15. A digging and planting machine according to claim 10 having a time relay controlling the time required for the digging and planting tool to carry out a normal digging operation, which in the absence of a signal of abnormal resistance to penetration of the ground by the digging and planting tool runs its full time cycle and then controls raising of the tool to an at-rest position after the hole is dug and the plant planted in it; and having the signalling means arranged to interrupt the time relay and prematurely cut this time so that the tool immediately returns to the at-rest position when the digging must be aborted.

16. A digging and planting machine according to claim 10 in which the sensing and signalling means is carried on the vehicle together with the digging and planting tool; and the tool comprises a reciprocably movable digging tip which is biased towards the ground, and which is moved against the biasing force when a predetermined resistance to penetration of the ground by the tip is encountered; and the tip actuates the sensing and signalling means after having moved a selected distance.

17. A digging and planting machine according to claim 16 comprising a plurality of a sensing and signalling means arranged to be actuated in sequence after the tip has moved a selected increment of its full reciprocation.

18. A digging and planting machine according to claim 10 in which the sensing and signalling means is carried on the vehicle in a separate location, spaced from the digging and planting tool, and comprises a reciprocable feeler means equivalent in ground penetrating capability to the digging tip, and biased towards the ground, and moved against the biasing force when a predetermined resistance to penetration of the ground by the feeler means is encountered; and actuates the sensing and signalling means after having moved a selected distance.

19. A digging and planting machine according to claim 18 comprising a plurality of sensing and signalling means, arranged to be actuated in sequence after the feeler has moved a selected increment of its full reciprocation.

20. A digging and planting machine according to claim 10 comprising means for compacting earth about the plant after it has been deposited in the hole; and means for moving the digging and planting tool and the compacting means separately and together between ground-elevated and ground-contacting positions.

21. A digging and planting machine according to claim 10 comprising closure means movable between a first position closing off the open tip end of the digging and planting tool for digging a hole, and a second position exposing the open end for delivery of a plant from the planting tool into the hole.

* * * * *